United States Patent Office 3,495,248
Patented Feb. 10, 1970

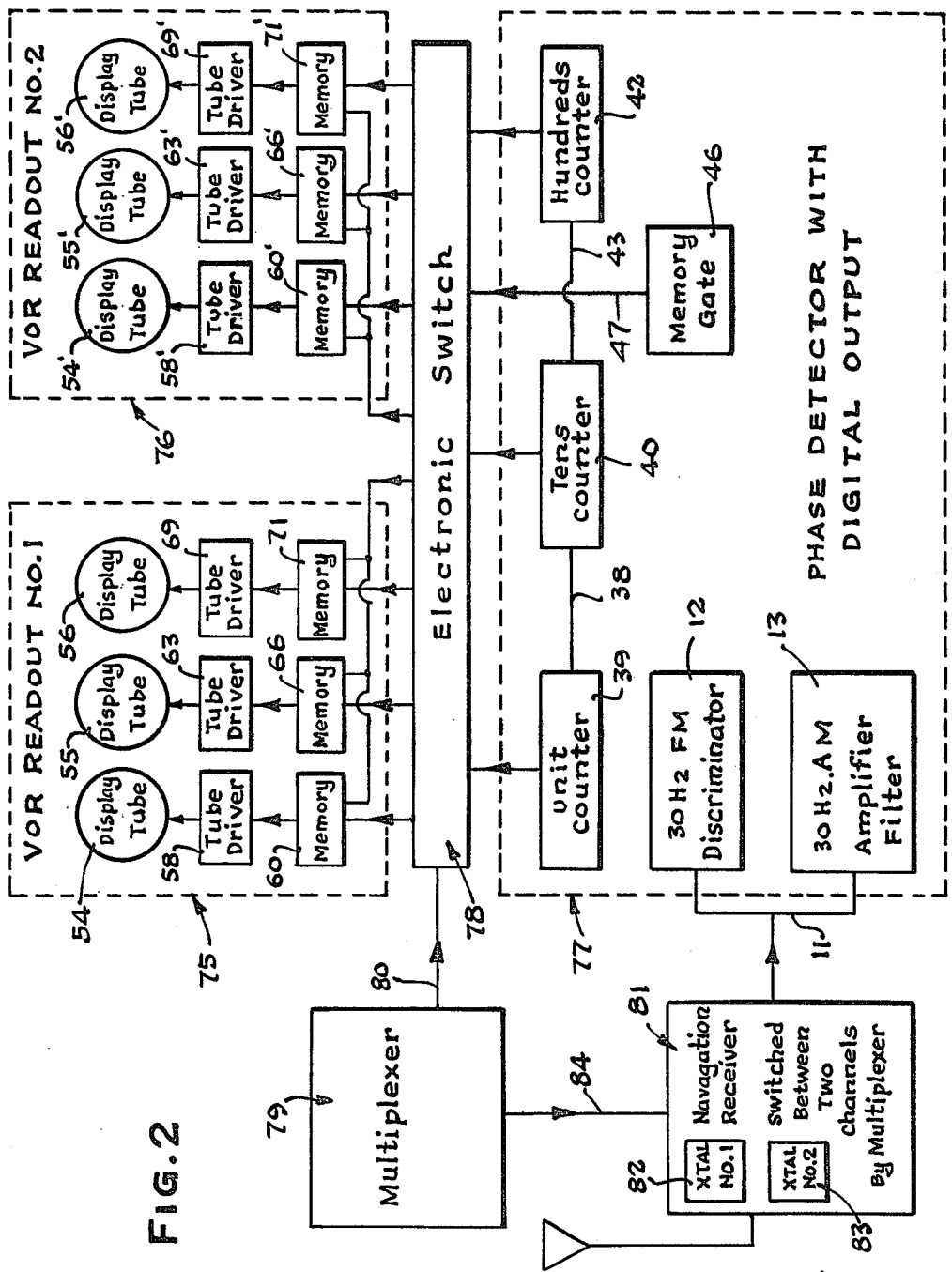

3,495,248
OMNI NAVIGATIONAL COMPUTER AND VISUAL INDICATOR
Edward O. Raether, 206 Ronda Road, McHenry, Ill. 60050, and Billy M. Maddox, 809 S. See-Gwun, Mount Prospect, Ill. 60056
Filed Mar. 4, 1968, Ser. No. 710,075
Int. Cl. G01s 1/44
U.S. Cl. 343—106     12 Claims

ABSTRACT OF THE DISCLOSURE

An aircraft receiver tuned to an Omni station is connected to an electronic phase detector which produces a pulse when the reference component of the station's signal crosses zero and produces a second pulse when the directional component of the station's signal crosses zero. Through a flip-flop, a counter main gate is opened by the reference resultant pulse and closed by the directional resultant pulse. A 108 kc. oscillator feeds impulses through the gate, when open, to a counter which thereby gives a digital count of the phase difference between the two components. The counter first divides the digital count by 10 and then feeds the result to a unit counter, a tens counter and a hundreds counter. The counter feeds a visual digital display device so this digital count may be visually read by the pilot. In a modification, the multiplexer alternates the aircraft receiver between two Omni stations, and likewise alternates the counter between two visual display devices so that the pilot gets a concurrent reading of the aircraft position with respect to the two Omni stations.

BACKGROUND OF THE INVENTION

Omni stations are positioned at various known geographic locations to facilitate the navigation of aircraft flying in the vicinity of those geographic locations. Each station broadcasts a radio signal comprising a main carrier, to which the aircraft receiver is tuned, this carrier is a directional beam which sweeps 360° around the station in a continuous rotation. The main carrier is amplitude modulated (AM) by a 30 cycle sine wave. When the beam traverses magnetic north at the Omni station, the sine wave is at zero crossing, that is, the mid line of the sine wave. This 30 cycle sine wav is referred to as the directional component or signal.

Also, the signal broadcast by the Omni station includes a 9960 cycle subcarrier, which is frequency modulated (FM) by a 30 cycle sine wave, 30 percent modulation. This is referred to as the reference component or signal. The reference component and the directional component are in phase, both at zero crossing, when the station's beam traverses magnetic north. As the beam moves farther and farther away from magnetic north, there is an increasing difference in the phase of the directional sine wave as compared to the reference sine wave. This shift in phase is directly proportional in degrees to the number of degrees that the beam has moved from magnetic north.

When the beam is directed at an aircraft flying in the vicinity of the Omni station, and thus received by the aircraft receiver, the bearing between the station and the aircraft will correspond to the phase difference between the reference signal and the directional signal. Conventional aircraft devices employ a phase difference detector, having a dial and null meter which is manipulated by an operator to obtain a reading on the dial of the difference in phase between the directional signal and the reference signal. A readout is then obtained from the calibration on the dial after he has centred the null meter.

In a rapidly moving aircraft this conventional apparatus has distinct disadvantages. If the pilot is doing the manipulating, his attention is distracted from his duties of flying the aircraft for a period of time. Also, if the aircraft personnel are seeking to ascertain their position by triangulation with respect to two Omni stations, it is impossible for them to do so any more accurately than ascertaining that they are within a circle, the exact size of which is unknown, but which may have a radius as much as several miles. This is due to the fact that after they ascertain their bearing from the Omni station they must then take the time to tune the aircraft receiver to the sound Omni station and then adjust the phase detection dial and meter with respect to the second Omni station. A high speed aircraft will have moved several miles after the first reading but before the second reading is obtained. In addition, the phase detection accuracy of conventional equipment is not highly accurate and the inaccuracy is reflected in lack of resolution of the true bearing between the aircraft and the Omni station from which a reading is obtained.

The principal object of the present invention is to provide apparatus sufficiently compact to be used even on small aircraft which will overcome the foregoing disadvantages and give the pilot a continuous visual readout of the bearing between the aircraft and an Omni station to which the aircraft receiver is tuned. Once the receiver is tuned to an Omni station, the pilot need make no further manipulations to ascertain the bearing between it and the aircraft, but, merely by a glance at a visual display, can at any instant determine that bearing. In an alternative embodiment two such visual displays are provided so that merely by glancing at the two the aircraft personnel will know at any instant what are the bearings between the aircraft and two Omni stations, thus eliminating the error caused by two different readings taken at different times, between which the aircraft has moved some distance.

A further advantage is that merely by the flip of a switch the aircraft personnel can have their bearing, with respect to the Omni station, displayed either for the condition of flying toward the station or for the condition of flying away from the station, depending upon which they desire as a result of the direction of movement of the aircraft.

SUMMARY OF THE INVENTION

The present invention relates to navigational apparatus for use on an aircraft or the like which when tuned to an Omni station will, without any manipulation on the part of the personnel, give a digital readout of the phase difference between the reference and the directional signals from the station and display that digital readout numerically for visual assimilation by the aircraft personnel.

DESCRIPTION OF THE DRAWINGS

FIGURE 2 is a diagrammatic alternative embodiment providing two visual readouts of bearing to two Omni stations using a single navigation receiver which is multiplexed between the two stations.

DESCRIPTION OF SPECIFIC EMBODIMENTS

Figure 1:
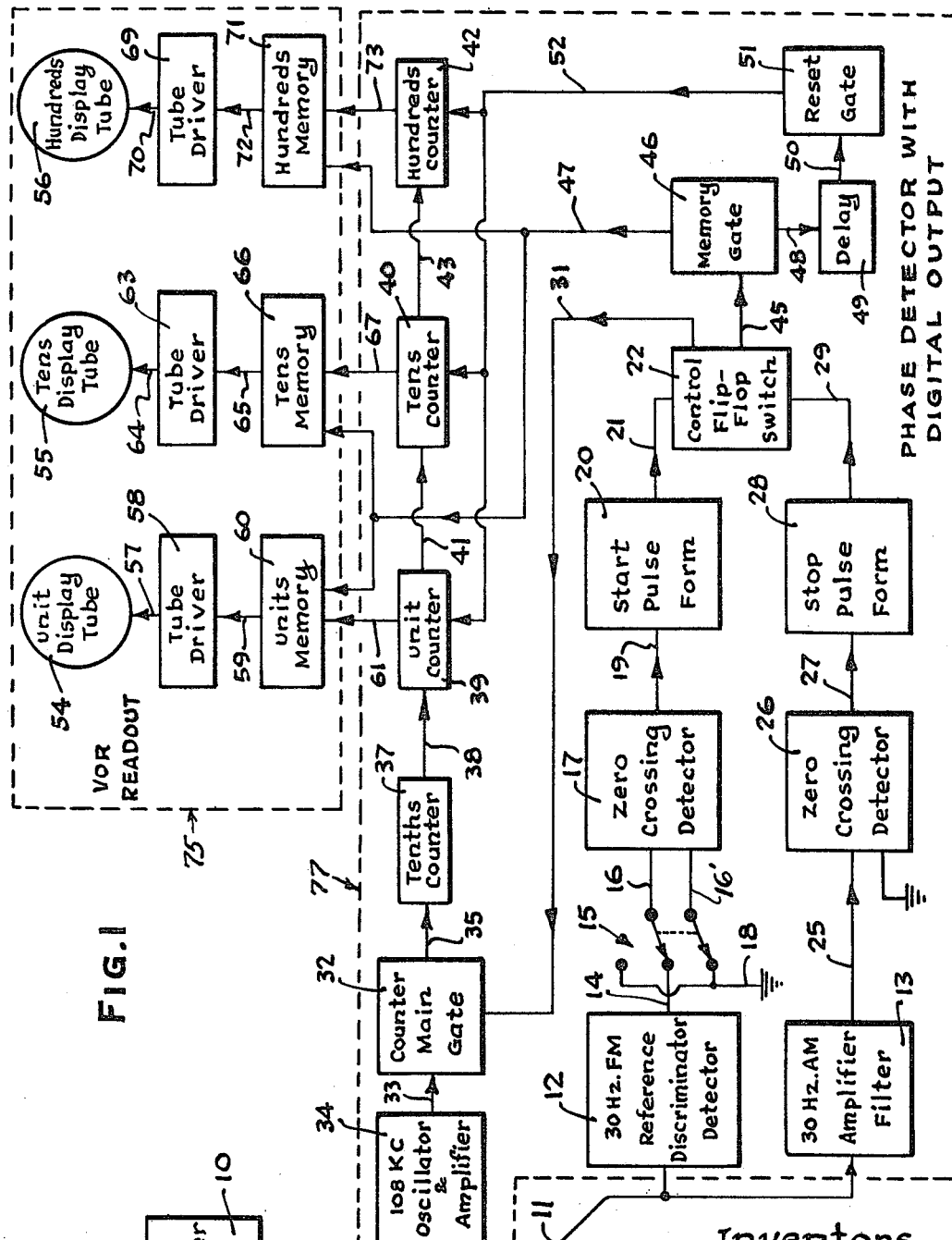
FIGURE 1 is a diagrammatic illustration of an embodiment of an aircraft borne apparatus embodying the present invention.

In the apparatus of FIGURE 1, the aircraft receiver 10 is tuned to the main carrier frequency of a selected Omni station. At line 11, receiver 10 emits the 30 cycle directional signal that was in the amplitude modulation of the carrier as well as the frequency modulated subcarrier.

Phase detector with digital output

The signals from receiver 10 go to a 30 cycle FM reference discriminator detector 12, and to a 30 cycle AM amplifier filter 13. In the FM detector the FM subcarrier is demodulated and the 30 cycle reference signal is applied to an output comprising line 14. A manually operable double-throw switch, generally 15, is connected to output 14 and to two inputs 16 and 16' of a zero crossing detector 17. Switch 15 is also grounded through a line 18. The arrangement is such that either of input 16 or 16' is connected to output 14, while the other input is connected to ground through 18. This arrangement, as subsequently described, permits the user to obtain a reading for movement away from the Omni station or for movement toward the Omni station, as the case may be. Line 19 represents the output of the zero crossing detector 17, as well as the input of the start pulse form 20. Line 21 represents the output of the start pulse form 20 and one input of a flip-flop 22 serving as an electrical switch. When the zero crossing detector 17 determines that the sine wave at output 14 is crossing the zero or reference line in one direction (assume minus to plus) a signal is produced at line 19 which causes the start pulse form 20 to produce a pulse at line 21.

After being filtered out and amplified, the 30 cycle directional signal (resulting from the amplitude modulation) appears at line 25, which is the output of amplifier-filter 13 and the input of zero crossing detector 26. Zero crossing detector 26 is like that illustrated at 17 and has a second input which is grounded so that it produces a signal at output 27 when the 30 cycle sine wave signal at 25 crosses the zero or reference line in a predetermined polarity (assume minus to plus). Line 27 also represents the input of stop pulse form 28, which produces a pulse at output line 29 when such a signal occurs at input line 27.

Flip-flop 22 is caused to assume one state when a pulse is received at input 21, and caused to assume the other state when a pulse is received at input 29. In the first state, it sends a signal via line 31 (forming a control input) to the counter main gate 32 to open the gate; while in the second state, the signal through line 31 from flip-flop 22 to gate 32 closes the gate. Gate 32 is constantly fed a series of impulses through line 33 (forming an informational input) from a 108 kc. oscillator and amplifier 34. When the gate 32 is open, these pulses from the oscillator appear at output line 35, and when gate 32 is closed, no impulses appear at line 35. Line 35 connects to a tenths counter 37. The effect of the tenths counter 37 is to divide the pulses received from line 35 by ten, and to apply the resulting pulses at line 38. Thus when gate 32 is open pulses appear at line 38 at the rate of 10.8 kc. Each pulse represents one degree of arc (30 times 360 equal 10.8 kc.). This is a digital count of the phase difference between the reference signal and the directional signal.

Line 38 connects to a unit counter 39. In the unit counter each pulse received from line 38 is counted as one degree of arc. Unit counter 39 has a tens counter 40 connected thereto by line 41. A hundreds counter 42 is connected to tens counter 40 by line 43.

Each time flip-flop 22 receives a pulse from line 29 it produces an output signal at its second output line 45. Through a memory gate 46 this signal is applied to line 47 (the actuating input) to open the memories 60, 66 and 71, hereinafter described. It is also applied to a line 48, which after a delay 49 appears at line 50. From line 50 a signal passes through a reset gate 51 and appears at line 52 where it serves to clear the counters 39, 40 and 42. It will be apparent that line 48 to delay 49 could be an extension of line 45 rather than originating at gate 46.

VOR readout

The units of the angular amount of arc are read out on tube 54, the tens on tube 55, and the hundreds on tube 56. These are Nixie (trademark of Burroughs Corp.) tubes. Those skilled in the art will be aware of other numerical readout means that could be employed. Tube 54 is connected by line 57 to a tube driver 58, which in turn is connected by line 59 to memory 60. Memory 60 is connected by line 61 to unit counter 39. Tube 55 has a driver 63 connected thereto by a line 64. A line 65 connects driver 63 to memory 66. Memory 66 is connected by line 67 to counter 40. Tube 56 has a driver 69 connected thereto by line 70. A hundreds memory 71 is connected to driver 69 by line 72 and to counter 42 by line 73. Line 47 connects to memories 60, 66 and 71, when a signal appears on line 47, it opens the memories to receive from the respective counters the amounts appearing thereon. Lines 61, 67 and 73 respectively form the information inputs to memories 60, 66 and 71.

Operation of FIGURE 1

Assume that the aircraft is flying towards a given Omni station. The aircraft receiver 10 is tuned to the frequency of the main carrier of that station. As the beam of the station's signal passes due north, both the 30 cycle reference signal (FM modulation) and the 30 cycle directional signal (AM modulation) are in phase. They are both crossing the reference line in the same direction (assume minus to plus). Assume that the beam turns 25° of arc before it is pointed at the airplane and received thereby. During this time the directional signal will have moved 25° out of phase with the reference signal. During the time that the beam is being received by the aircraft receiver 10, the 30 cycle reference signal will appear at output 14 and be applied to input 16 of the zero crossing detector 17. At the instant this sine wave crosses zero, a signal is produced at line 19, which results in a pulse at line 21. This pulse actuates flip-flop 22 to open gate 32, whereupon line 35 commences receiving impulses from oscillator 34 at a 108 kc. rate. Shortly thereafter, the directional signal at line 25 will cross zero to produce a signal at line 27, having been detected by zero crossing detector 26. This will result in a pulse at line 29 to actuate flip-flop 22 and close gate 32. Based on the assumption that there was 25° of arc between the time that the beam at the Omni station passed due north until it was pointed at the airplane, there would, during the time that gate 32 was open, be 250 impulses appear at line 35. This being divided by ten at tenths counter 37, there would be 25 impulses appear at line 38. This would be divided by 10 at units counter 39 so that the units counter would count a total of 25 units. Five of these units would remain in the units counter and two 10's would appear in the tens counter 40.

The stop pulse in line 29 also would appear as a signal at output 45 of the flip-flop, causing gate 46 to open the memories 60, 66 and 71 to receive the values established in the counters 39, 40 and 42 respectively. These values would be displayed on the respective display tubes 54, 55 and 56. After a brief delay to permit this transfer from the counters to the memories, reset gate 51 would produce a signal through line 52 to clear counters 39, 40 and 42. The process would be repeated commencing each time that the 30 cycle reference signal appeared at line 14 and ending with the zero crossing of the 30 cycle directional signal appearing at line 25.

Assuming that the airplane was flying away from (rather than toward) the Omni station, its course would be 180° from the course it would be flying, along the same line, if moving toward the station. To correct for this, switch 15 is reversed in position so that input 16' is now connected to output 14 and input 16 is connected to ground. This would cause zero crossing detector 17 to operate 180° out of phase from its previous operation. Thus, if the zero crossing detector had previously been actuated on the minus to plus crossing of the sine wave, it would now operate on the plus to minus crossing of the sine wave. Now, the signal at line 19 and the pulse at line 21 would be 180° ahead of the signal and pulse previously appearing at these respective points. Therefore, switch 22 would open gate 32 to pass 1800 more impulses to line 35 than had previously been the case. The count in counters 39, 40 and 42 would now read 205° of arc, rather than 25°. Tube 56 would read 2, tube 55 would read 0, and tube 54 would read 5. As displayed on the instrument panel in front of the pilot, the physical positions of tubes 54 and 56 would be reversed so that the pilot would read 205 on the three tubes.

Using subminiature modular components, the complete unit, as illustrated in FIGURE 1, except for receiver 10, has been produced in a light weight package not larger than about 3 inches by 3 inches by 9 inches.

Embodiment of FIGURE 2

FIGURE 2 gives a pilot a continuous visual reading of the bearings between his airplane and two Omni stations. It comprises a first visual readout means generally 75, and a second visual readout means generally 76. Each of these readout means corresponds to the VOR readout device described in connection with FIGURE 1. This embodiment also includes a phase detector with digital output generally 77, which again corresponds to that structure as described in conjunction with FIGURE 1. Connected between the readout means and the digital output of the phase detector is an electronic switch generally 78, which is connected to and operated by a multiplexer generally 79, as indicated by line 80. The aircraft navigational receiver generally 81 is crystal controlled as to its turning frequency by one of a plurality of crystals, such as 82 and 83. For example, if crystal 82 is rendered effective the receiver will be tuned to one Omni station, and if crystal 83 is rendered effective the receiver will be tuned to another Omni station. Multiplexer 79 through line 84 determines which crystal is effective at any given time. In some embodiments the crystals 82 and 83 may be a physical part of the multiplexer, as will be apparent to those skilled in the art.

At regular intervals, multiplexer 79, acting through crystals 82 and 83, tunes receiver 81 first to one Omni station, then to another and then back to the first, etc. At the same times, multiplexer 79 actuates electronic switch 78 so that when crystal 82 is effective, visual readout 75 is connected to phase detector 77, and when crystal 83 is effective, the visual readout 76 is connected to the phase detector 77. Thus, when signals are being received from one Omni station, as determined by crystal 82, the display tubes 54, 55 and 56 will give the course between the aircraft and that Omni station; and when the crystal 83 tunes the receiver to a second Omni station, the tubes 54', 55' and 56' will give the reading of the bearing between the aircraft and the second Omni station. When readout 75 is connected to phase detector 77, its memories 60, 66 and 71 will be periodically receiving bearings from the counters 39, 40 and 42. During that same period of time readout 76 will have retained in its memories 60', 66' and 71', the bearing reading previously established therein with respect to the Omni station to which crystal 83 is tuned. Thereafter, when readout 76 is connected to phase detector 77, its memories will be reset for the present bearing between the aircraft and the Omni station to which crystal 83 is tuned, while readout 75 will have retained in its memories 60, 66 and 71, the last bearing set therein between the aircraft and the Omni station to which crystal 82 is tuned.

We claim:

1. In a navigational apparatus for use on an aircraft or the like and for use with ground based stations which send out directional signals having two components which differ in phase corresponding to the instantaneous difference between the direction of the signals and true north, which signals are received by a receiver on an aircraft and employed to determine the directional position of the aircraft in relation to the stations, the improvement comprising:

first means including phase detection means connected to said receiver to receive said signals and to provide a digital count of the phase difference between the two components of a station to which the receiver is tuned, said first means including a units counter, a tens counter and a hundreds counter in which are periodically stored a reading identifying the present bearing between the aircraft and said station; and visual display readout means including a unit memory, a tens memory and a hundreds memory, said memories being connected to said first means to periodically receive the reading then appearing in the counters, said visual display readout means providing a visual numerical reading of the digital count appearing in the memories and thus of a course between the aircraft and the station to which the receiver is tuned.

2. In an apparatus as set forth in claim 1, wherein said first means clears said counters after the reading appearing therein has been transferred to the memories.

3. In an apparatus as set forth in claim 1, wherein said phase detection means includes:

first detector means to determine when one component is at a particular point in its cycle; and second detector means to determine when the other component is at a particular point in its cycle; and said first means includes:

an oscillator to produce impulses at a given frequency;

main gate means connected to said oscillator and to said counters to feed said impulses to said counters when said gate means is open and to block said pulses from said counters when said gate means is closed; and switch means connected to said detector means and to said gate means to open said gate means when one component is at said particular point in its cycle and to close said gate when the other component is at said particular point in its cycle.

4. In an apparatus as set forth in claim 3, wherein said first means includes:

memory gate means connected to said switch means and to said memories to open the memories to receive the digital values present in the respective counters upon the actuation of the switch means to close said main gate means; and reset gate means connected to the switch means and to the counters to clear the counters after said memory gate means has opened the memories to receive the values in the counters and before the switch means opens said main gate means.

5. In an apparatus as set forth in claim 4, wherein said first means includes:

a 30 cycle frequency modulation discriminator connected to said receiver and said first detector means; and a 30 cycle amplitude modulation filter connected to said receiver and said second detector.

6. In an apparatus as set forth in claim 5, wherein said oscillator produces pulses at a frequency of 108 kilocycles; and said first means includes means between said main gate means and said unit counter to divide by ten the number of pulses flowing through the open main gate means.

7. In an apparatus as set forth in claim 6, including:

a second visual display readout means as defined in claim 1;

an electronic switch connected between the first means and the two readout means, said switch having two states, in one state said first means being connected to one readout means to supply the digital count from the first means to the one readout means, and in the other state said first means being connected to the other readout means to supply the digital count from the first means to the other readout means; and multiplexer means connected to said electronic switch to periodically change said electronic switch from one state to the other and thereafter back to said one state, said multiplexer means being connected to said receiver to change said receiver from one station to another station when said switch is actuated to change from one state to the other and vice versa.

8. In a navigational apparatus for use on an aircraft or the like and for use with ground based stations which send out directional signals having two components which differ in phase corresponding to the instantaneous difference between the direction of the signals and true north, which signals are received by a receiver on an aircraft and employed to determine the directional position of the aircraft in relation to the stations, the improvement comprising:

first means including phase detection means connected to said receiver to receive said signals and to provide a digital count of the phase difference between the two components of a station to which the receiver is tuned;

two visual display readout means for providing a visual numerical reading of the digital count and thus of a course between the aircraft and the station to which the receiver is tuned, each of said readout means having memory means for storing a count therein, each memory means having an information input and an actuating input;

an electronic switch connected between the first means and the two inputs of each memory means, said switch having two states, in one state said first means being connected to one readout means to supply the digital count from the first means to the memory means of the one readout means, and in the other state said first means being connected to the other readout means to supply the digital count from the first means to the memory means of the other readout means; and automatic multiplexer means connected to said electronic switch to periodically change said electronic switch from one state to the other and thereafter back to said one state, said multiplexer means being connected to said receiver to change said receiver from one station to another station when said switch is actuated to change from one state to the other and vice versa.

9. In an apparatus as set forth in claim 8, wherein said phase detection means includes:

a units counter, a tens counter and a hundreds counter;

first zero crossing detector means to determine when one component is at a particular point in its cycle; and second zero crossing detector means to determine when the other component is at a particular point in its cycle; and said first means includes:

an oscillator to produce impulses at a given frequency;

main gate means connected to said oscillator and to said counters to feed said impulses to said counters when said gate means is open and to block said pulses from said counters when said gate means is closed; and switch means connected to said detector means and to said gate means to open said gate means when one component is at said particular point in its cycle and to close said gate when the other component is at said particular point in its cycle.

10. In an apparatus as set forth in claim 9, wherein said first means includes:

a 30 cycle frequency modulation discriminator connected to said receiver and said first zero crossing detector means; and a 30 cycle amplitude modulation filter connected to said receiver and said second zero crossing detector.

11. In a navigational apparatus for use on an aircraft or the like and for use with ground based stations which send out two alternating frequency directional signals which differ in phase and have corresponding characteristic points in their cycles, which characteristic points likewise differ in phase, corresponding to the instantaneous difference between the direction of the signals and true north, which signals are received by a receiver on an aircraft and employed to determine the directional position of the aircraft in relation to the stations, the improvement comprising:

a free running, constant frequency, oscillator having an output at which a signal of a known frequency is produced;

a gate having an output, an informational input and a control input means, said informational input being connected to the oscillator input, whereby when said gate is open said oscillator signal appears at the output thereof;

first signal characteristic detector means having an input to which one of said two directional signals is applied and an output at which a gate operating signal occurs when said one of said directional signals reaches said characteristic point in its cycle, said output of said detector means being connected to said control input means to open said gate in response to said gate operating signal;

second signal characteristic detector means having an input to which the other of said two directional signals is applied and an output at which a second gate operating signal occurs when the other of the directional signals reaches said characteristic point in its cycle, said output of said second detector means being conected to said control input means to close said gate in response to said second gate operating signal;

counter means connected to the output of said gate to produce a count of the oscillator signal appearing at the gate output; and visual display readout means connected to said counter to visually display said count.

12. In an apparatus as set forth in claim 11, wherein said readout means includes a memory to retain, while said gate is closed, said visual display of the count obtained the last time the gate was open.

References Cited

UNITED STATES PATENTS

| | | | |
|---|---|---|---|
| 2,661,467 | 12/1953 | Jones | 343—106 |
| 3,266,041 | 8/1966 | Robins | 343—106 X |
| 3,386,096 | 5/1968 | Lundgreen et al. | 343—106 |
| 3,243,811 | 3/1966 | Hose. | |

RODNEY D. BENNETT, Jr., Primary Examiner

T. H. TUBBESING, Assistant Examiner

U.S. Cl. X.R.

343—5